United States Patent [19]

Gainey

[11] Patent Number: 4,927,117
[45] Date of Patent: May 22, 1990

[54] RIDING TRACTOR UMBRELLA

[76] Inventor: Michael D. Gainey, 100 Beth Dr., Darlington, S.C. 29532

[21] Appl. No.: 272,346

[22] Filed: Nov. 17, 1988

[51] Int. Cl.[5] .............................................. B60R 11/00
[52] U.S. Cl. ....................................... 248/539; 135/88; 280/32.5
[58] Field of Search ............... 248/511, 519, 523, 524, 248/527, 529, 534, 535, 538, 539, 314; 135/88, 89, 98; 224/274, 42.45 R; 280/DIG. 6, 292, 32.5; 56/DIG. 9, DIG. 14

[56] References Cited

U.S. PATENT DOCUMENTS

| 138,861 | 5/1873 | Cooper | 248/314 |
|---|---|---|---|
| 194,169 | 8/1877 | Pettibone | 135/98 |
| 336,363 | 2/1886 | Ward | 248/540 |
| 460,207 | 9/1891 | Lazarus | 280/644 |
| 462,265 | 11/1891 | Mason | 248/274 |
| 541,951 | 7/1895 | Slyder | 248/539 |
| 595,218 | 12/1897 | Stauffer | 248/314 |
| 840,241 | 1/1907 | Nootbaar | 248/276 |
| 840,406 | 1/1907 | Williams | 248/540 |
| 902,459 | 10/1908 | Conner | 248/515 |
| 2,126,457 | 8/1938 | East | 248/534 |
| 2,191,075 | 2/1940 | Hogan | 248/541 |
| 2,439,063 | 4/1948 | Shur | 248/534 |
| 2,634,740 | 4/1953 | Duke | 135/98 |
| 2,822,969 | 2/1958 | Cooper | 280/62 |
| 3,237,899 | 3/1966 | Lewis | 135/88 |
| 3,353,852 | 11/1967 | Wood | 248/511 |
| 4,008,874 | 2/1977 | Conway | 248/534 |
| 4,334,692 | 6/1982 | Lynch | 248/539 |
| 4,593,877 | 6/1986 | van der Wyk | 248/535 |

FOREIGN PATENT DOCUMENTS

| 35157 | 5/1973 | Australia | 248/511 |
|---|---|---|---|
| 2653466 | 6/1978 | Fed. Rep. of Germany | 248/519 |

Primary Examiner—Ramon O. Ramirez
Assistant Examiner—Robert A. Olson
Attorney, Agent, or Firm—Michael J. McGreal

[57] ABSTRACT

The present invention is directed to a unique means of attaching an umbrella to a lawn and garden tractor. This is accomplished through the use of an umbrella support plate which utilizes the accessory attachment apertures of the tractor for the mounting of the plate. Further, the umbrella support plate itself has one or more accessory attachment apertures which can be utilized for the attachment of a grass catcher, cart, roller or lawn aerator. The umbrella is supported over the operator of the lawn and garden tractor by means of one or more support shafts.

9 Claims, 2 Drawing Sheets

RIDING TRACTOR UMBRELLA

BACKGROUND OF THE INVENTION

This invention relates to a protective covering that is easily attached to and detached from a riding lawn mower. More particularly, this invention relates to an umbrella for riding styled lawn mowers, and in particular, to an umbrella attachment assembly which utilizes the tractor accessory implement attachment means for the attachment of the umbrella to the lawn tractor while yet providing for the attachment of accessories.

Large farm tractors and similar equipment today provide a cabin in which the operator sits. This cabin keeps the operator shaded and in many instances, is air conditioned, thereby keeping the operator in a very pleasant environment. However, there is very little that has been developed with regard to the home style lawn and garden tractor which is utilized by many homeowners as the primary means of keeping their grass in a neat condition. There are available some canvas enclosures for such riding tractors which are to be utilized in the winter in conjunction with snow plowing or snow blowing. These types of protective coverings essentially form a fully closed cabin around the operator of the lawn and garden tractor. The intent of such an enclosure is to keep snow, wind and rain off the operator. Such a protective means would be fully ineffective during the summer months. In a fully closed canvas compartment the heat from the sun would quickly become unbearable. Consequently, such enclosures are only utilized in the winter during periods of snow and rain.

However, there is a need to be able to provide the operator of a lawn and garden tractor with a means to shade himself while he is working outside. This is particularly the case when we constantly hear that excessive exposure to the sun can lead to various skin cancers. In this regard, a person would prefer to be out in the sun doing more pleasurable things than cutting the grass or otherwise maintaining his property during the time that he is to be exposed to the sun. That is, a person would prefer to be playing a sport or to be swimming while getting a dosage of sunlight rather than operating a lawn mower. The present invention is directed to an umbrella assembly for lawn and garden riding tractors, and in particular, to an umbrella assembly which can be quickly attached to the lawn and garden tractor and which can be quickly detached from the lawn and garden tractor. Further, in the use of this umbrella, the lawn and garden tractor does not lose any of its other features. What is meant by this is that the attachment of the umbrella assembly does not inhibit the attachment of accessory implements such as lawn sweepers, carts, soil aerating equipment, a roller or the like from also being utilized at the same time.

BRIEF DESCRIPTION OF THE INVENTION

This invention is directed to an umbrella assembly which can be utilized on lawn and garden types of riding tractors. The umbrella assembly consists of an umbrella having a diameter sufficient to keep the operator of the lawn and garden tractor out of the sun as much as possible while being easily attachable and detachable from the lawn and garden tractor. A significant feature of the present invention lies in the utilization of the accessory implement attachment means which is an opening or openings at the rear of the tractor. By accessory implement opening or openings is meant that hole, or plurality of holes available on a lawn and garden tractor for attaching accessories. The umbrella itself consists of an upper canopy which has a diameter sufficient to maintain the operator in the shade throughout a significant portion of the day. The umbrella assembly is attached to the rear of the tractor by means of the single hole or the plurality of holes that are provided for the hooking of accessories onto the tractor. Attached to the accessory implement attachment opening or openings is an adapter device to support the umbrella and to provide a means to attach accessories.

The adapter device consists of a planar or non-planar plate which is attached to the lawn and garden tractor by means of the accessory implement attachment means. In attaching the umbrella to the lawn and garden tractor, an adapter plate is attached to the lawn and garden tractor using the existing accessory implement attachment means. The adapter plate consists of a plate which can be attached to the tractor at one or more locations and which plate, or plate fastening means, has mounted thereon an umbrella holder and which still has an accessory implement attachment opening or plurality of openings. That is, even when the umbrella is being utilized by the operator of the lawn and garden tractor, the lawn and garden tractor can be used with other suitable attachments. Included in these attachments is for instance a grass catcher. The adapter plate will have various shapes and will have either an upstanding shaft onto which the umbrella assembly is supported or a shaft into which the umbrella assembly is lowered. The net effect is that the operator of the lawn and garden tractor can be shaded from the sun but still get any cooling breezes.

DETAILED DESCRIPTION OF THE INVENTION

The present invention is directed to a unique way of mounting an umbrella onto a lawn and garden tractor. One objective is to provide the operator of the lawn and garden tractor with a more comfortable environment in which to work. The operator of the lawn and garden tractor by means of the umbrella assembly is shielded from the direct rays of the sun but will still receive the various cooling breezes of the day. This is the case since only an umbrella covering is utilized. There is no encapsulation of the operator of the lawn and garden tractor in an enclosure.

Figure 1:
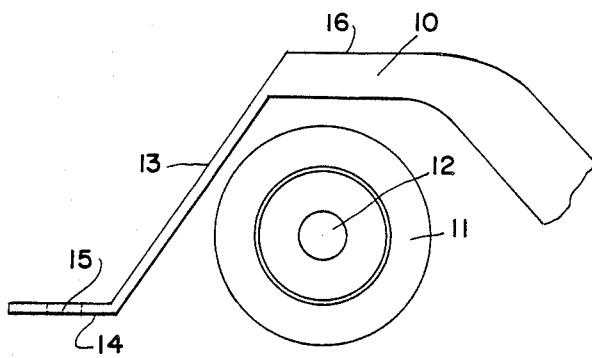
FIG. 1 is an elevational view of the rear section of a lawn and garden tractor.
Figure 2:
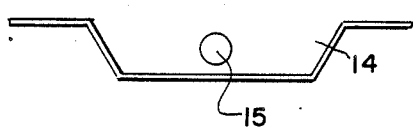
FIG. 2 is a top plan view of the accessory implement attachment hole that is provided on lawn and garden tractors.
Figure 3:
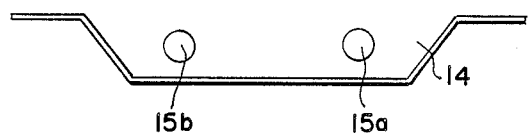
FIG. 3 is a variation of the accessory implement attachment hole of FIG. 2, wherein two attachment holes are provided on the lawn and garden tractor.

The invention will now be disclosed in more detail with reference to the drawings. In FIG. 1 there is shown the rear section 10 of a typical lawn and garden tractor. This consists of a seat 16 and a rear protruding section 13. This is all supported by wheel 14 via axle 12. In this view an extension of the rear portion 13 consists of a horizontal extension 14 which has at least one aperture 15 therein. It is this aperture 15 that is utilized for the attachment of various accessory implements to the lawn and garden tractor. This aperture 15 and extension piece 14 are shown in more detail in FIGS. 2 and 3. In FIG. 2 there is shown a top plan view of extension 14 and implement accessory aperture 15. In FIG. 3 there is shown the embodiment where there are two apertures which can be utilized for the attachment of accessories. These are apertures 15a and 15b.

Figure 4:
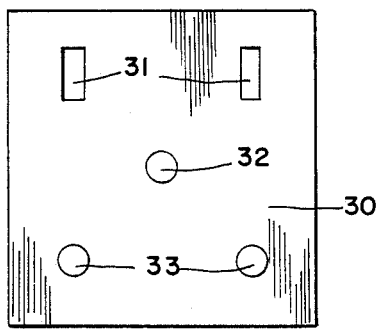
FIG. 4 is a top plan view of an umbrella supporting plate that could be utilized in conjunction with a tractor having an accessory implement attachment means as is shown in FIG. 3.

In FIG. 4 there is shown an umbrella support plate that would be utilized in conjunction with the implement accessory apertures 15a and 15b. In this view there is shown the umbrella support plate 30 which has slot openings 31 which are adapted to adjustably mate with aperture openings 15a and 15b on the rear of the lawn and garden tractor. The plate is attached to the lawn and garden tractor by means of two bolts passing through holes 31 of the umbrella support plate and apertures 15a and 15b of the lawn and garden tractor. The apertures that are provided for the mounting of further accessories are designated as openings 33. The mounting means 32 for the umbrella may either be a metal bar or tubular shaft over which the hollow shaft of the umbrella will fit, or it can be a hollow shaft into which the umbrella shaft will fit. Either technique can be utilized. However, it is preferred that part 32 be a tubular shaft over into which the shaft of the umbrella will pass. The tubular shaft will have a drain hole at the bottom which passes through the plate so that it will not collect water.

Figure 5:
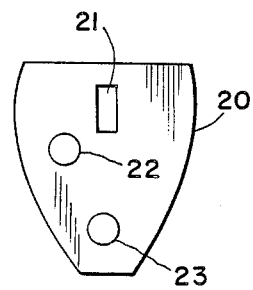
FIG. 5 shows a plate that can be utilized to support the umbrella on tractors which have an accessory implement mounting technique as is shown in FIG. 2.

FIG. 5 shows an umbrella support plate which would be utilized with the accessory implement attachment means that is shown in FIG. 2. In this instance, support plate 20 is attached to the lawn and garden tractor by mean of adjustable slot opening 21. Slot opening 21 is made to overlay opening 15 and the plate 20 is hooked to the tractor by means of a nut and bolt assembly. In this view 22 is the umbrella supporting means. This, as in FIG. 4, can be either a shaft over which the umbrella shaft fits or it can be a tubular piece into which the umbrella will fit. Opening 23 is an accessory implement attachment opening for a cart, grass catcher or the like.

Figure 6:
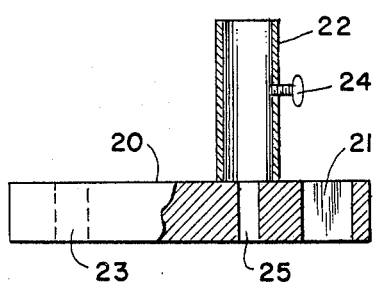
FIG. 6 is a side elevational view of an umbrella support plate wherein the umbrella fits down inside a provided tubular portion.
Figure 7:
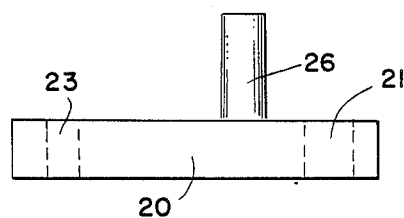
FIG. 7 is a side elevational view of an umbrella support plate wherein the umbrella fits down over a solid pin.

FIGS. 6 and 7 show the mounting means for the umbrella on the umbrella support plate. FIG. 6 shows the embodiment where the umbrella support is an open tube into which the umbrella shaft will fit. After the umbrella shaft is inserted into the tube, set screw 24 can be adjusted to tighten the shaft of the umbrella within tube 22. Drain hole 25 provides a means to drain any water from tubular shaft 22. In FIG. 7 there is shown a rod 26 which extends upwardly from the umbrella support plate. In this instance the umbrella shaft will fit downwardly over the shaft 26 which can be solid or tubular with a cap plug on the top to prevent rain from entering. In this instance it is possible for the umbrella shaft to have a set screw which can be tightened against this center shaft 26.

Figure 8:
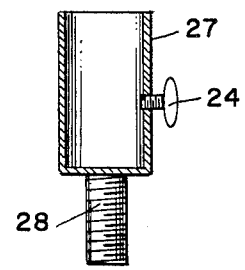
FIG. 8 is a side elevational view of an umbrella support where the attachment means to the lawn and garden tractor supports the umbrella.

In FIG. 8 there is shown a bolt means for attaching the plates 20 or 30 to the lawn and garden tractor where this bolt means is also the umbrella support. The umbrella shaft will fit down into shaft 27 and be attached to the lawn and garden tractor by means of threaded portion 28. This bolt means is shown here to be tubular where the umbrella shaft fits down into the tubular shaft. However, this can be a solid piece over which the umbrella fits or can be a tubular shaft with a plug at the top. The umbrella would likewise fit over this tubular shaft. Since the embodiment where the umbrella shaft fits into the tubular shaft would not have a drain hole a plug could be fitted into the opening when the umbrella shaft is not in tubular portion 27. This will prevent rain from entering while it is still attached to the tractor.

Figure 9:
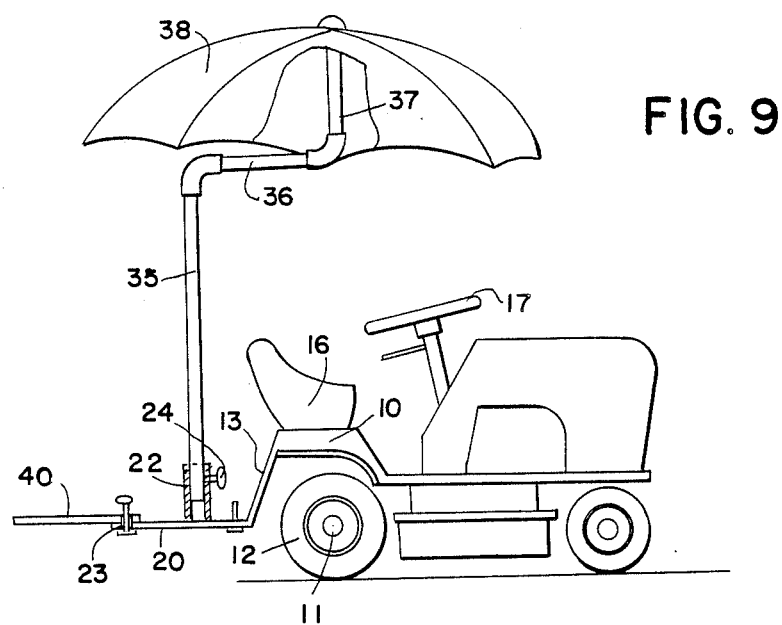
FIG. 9 is a side elevational view of a lawn and garden tractor having an umbrella mounted thereon while yet having a pull cart being pulled by the lawn and garden tractor.

FIG. 9 shows the umbrella mounted on a lawn and garden tractor. In this view there is lawn and garden tractor with seat 16 and steering wheel 17. Mounted on the rear of this tractor utilizing the accessory implement aperture is the umbrella support plate 20. This umbrella support plate has a tubular shaft 22 into which the shaft 35 of the umbrella slideably fits. At the upper end of shaft 35 which is in an essentially vertical orientation, there is a horizontal shaft 36 which is adapted to extend the umbrella forwardly so that it will be located over the operator of the lawn and garden tractor. Extending upwardly from shaft 36 is umbrella shaft 37. Umbrella shaft 37 supports the umbrella canopy 38. The umbrella canopy 38 is of any standard construction for an umbrella. For instance, this can be similar to an umbrella that is utilized in conjunction with patio furniture. Also shown in this view is the ability of the tractor to still utilize other implements. Shown attached to accessory implement opening 23 of plate 20 is the attachment bar for a cart. This cart can be just an open standard cart or can be of the type that is utilized in conjunction with a grass catcher.

As can be seen from this description, the umbrella assembly can be quickly attached to, and detached from, the lawn and garden tractor. All that is necessary is that any set screw that is holding the shaft 35 within shaft 22 be loosened and the umbrella thereby removed. A clevis pin or a cotter pin could also be used with a hole passing through tubular shaft 22 and umbrella shaft 35. At this point, shaft 37 can be detached from shaft 36, and shaft 36 from shaft 37 and the umbrella canopy can be collapsed. However, there is no need to remove the umbrella support plate 20 from the lawn and garden tractor. There is also the option of leaving shafts 35 and 36 in place and only removing shaft 37 with the umbrella. In such an instance a storage stem could be fitted into shaft 37 in order to increase the ease with which the umbrella is collapsed.

As noted above, there is no need to remove the support plate from the lawn and garden tractor when the umbrella is not being used. This is the case since the plate 20 contains its own accessory attachment opening 23 so that the tractor can be utilized for other chores when the umbrella is not needed. For instance, on various cloudy days the umbrella would not be needed and the tractor could be utilized for all of its functions. This umbrella support plate in essence provides a universal attachment for various accessories while still providing a quick attachment and detachment technique for an umbrella. The net result is that a lawn and garden tractor is made to be more versatile. It can be utilized on hot sunny days and can be utilized by persons who are not to be exposed to excessive sunlight. Further, on hot sunny days, the operator will be much cooler since he will not be contacted by the rays of the sun, but yet will enjoy the various breezes that come up.

Various modifications can be made to the umbrella canopy and/or to the support technique for the umbrella. For instance, shafts 35 and 36 could be replaced by a single multi-curved shaft. Further, each bend in the umbrella support shafts can be a separate piece and not be a part of any other shaft. Also these various shafts can fit into each other as friction fits or pins such as cotter pins or clevis pins can be used. Yet other modifications are possible. However, all such modifications would be within the present invention which is directed to providing a means of attaching an umbrella to a lawn and garden tractor while yet providing for the full versatility and use of the lawn and garden tractor.

I claim:

1. A riding tractor suitable for cutting grass having a means to shelter the operator from the sun attached thereto comprising a riding tractor having at least one accessory implement attaching aperture on a rear portion thereof to attach accessory implements thereto, a plate having at least one aperture therethrough to align with the accessory implement attaching aperture on the rear portion of said riding tractor, means to attach said plate to the at least one accessory implement attaching aperture on a rear portion of the riding tractor, a shelter means to shelter said operator from the sun, means to attach to said plate said means to shelter said operator, and aperture means in said plate to attach an accessory implement to said plate.

2. A riding tractor as in claim 1 wherein said means to shelter the operator is an umbrella.

3. A riding tractor as in claim 1 wherein said plate has at least one adjustable aperture therethrough for attaching the plate to the tractor to support the shelter.

4. A riding tractor as in claim 1 wherein said means to shelter said operator is an umbrella and said means to attach to said plate said umbrella is a tubular shaft extending upwardly from said plate into which a shaft supporting said umbrella fits.

5. A riding tractor as in claim 1 wherein said shelter is an umbrella and said means to attach to said plate said umbrella is a shaft extending upwardly from said plate over which a shaft means supporting said umbrella fits.

6. A riding tractor as in claim 1 wherein said plate has a plurality of holes for attaching the plate to the tractor.

7. A riding tractor as in claim 1 wherein a means to attach said plate to the riding tractor also is the means to support said shelter.

8. A riding tractor as in claim 7 wherein said means to attach said plate is tubular and a support for said shelter fits therein.

9. A riding tractor as in claim 2 comprising a support for said umbrella which support extends vertically to a point above the head of the operator and extends horizontally over the head of the operator.

* * * * *